Patented Sept. 3, 1946

2,406,774

UNITED STATES PATENT OFFICE 2,406,774

SYNTHESIS OF RIBOFLAVIN AND INTERMEDIATES THEREFOR

Jonas Kamlet, New York, N. Y., assignor to Miles Laboratories, Inc., Elkhart, Ind., a corporation of Indiana No Drawing. Application June 28, 1943, Serial No. 492,622

13 Claims. (Cl. 260—211)

The present invention relates to a new synthesis or riboflavin. More particularly it relates to a new process whereby 6,7-dimethyl-9-(d-1'-ribityl) isoalloxazine, which is identical with the naturally occurring riboflavin, or vitamin B₂, may be synthesized. It has for an object to provide a simplified procedure for the synthesis of this vitamin, whereby some steps in the present synthesis may be eliminated. It has for a further object to provide a synthesis of riboflavin which does not require the use of the expensive and difficultly-obtainable pentose sugar, d-ribose.

In 1933, Gyorgy, Kuhn and Wagner-Jauregg, isolated riboflavin and recognized its identity with vitamin B₂ (Naturwissenschaften, 21, 560–1 of 1933). Shortly afterward, the structure of this vitamin was established to be 6,7-dimethyl-9-(d-1'-ribityl) isoalloxazine (Compound A):

(Compound A)

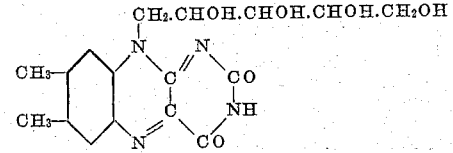

and it was synthesized by Karrer (Helv. chim. Acta, 18, 522–35 of 1935), and Kuhn (Berichte, 68, 1765–74 of 1935).

The basis of both the Kuhn and the Karrer processes is the condensation of 3,4-dimethyl-6-amino-phenyl-d-ribamine with alloxan to yield riboflavin. Karrer carries this condensation out in acid solutions (U. S. Patents 2,155,555 and 2,237,074), whereas Kuhn materially increases the yield of that condensation by effecting it in glacial acetic acid solution with the use of boric acid as a catalyst (U. S. Patent 2,238,874; Berichte, 68, 1282 of 1935). The 3,4-dimethyl-6-aminophenyl-d-ribamine required for this condensation with alloxan may be prepared by a number of methods as follows:

(a) 4,5-Dinitro-o-xylene is condensed with d-ribamine and reduced catalytically in aqueous alcoholic solution (Kuhn and Weygand, Berichte, 68, 1001 of 1935). The yields by this method are too low to be practical.

(b) 3,4-dimethyl, 6-nitroaniline is condensed with d-ribose and reduced (Kuhn et al., Berichte, 68, 1765 of 1935; 70, 773 of 1937).

(c) 3,4 - dimethyl, 6 - carbethoxyaminoaniline (Karrer et al., Helv. chim. Acta, 18, 69 of 1935; 18, 426 of 1935), or 3,4-dimethyl, 6-acetylaminoaniline (Karrer et al., Berichte, 68, 216 of 1935) is condensed with d-ribose, reduced and then saponified to the free amine, 3,4-dimethyl, 6-aminophenyl-d-ribamine.

(d) 3,4-dimethylaniline is condensed with d-ribose and the resultant riboside is catalytically reduced to 3,4-dimethylphenyl-d-ribamine. This compound is then coupled with an aryl diazonium salt to form the 3,4-dimethyl, 6-arylazophenyl-d-ribamine and the latter compound is reduced to the 3,4-dimethyl, 6-aminophenyl - d - ribamine. (Karrer et al., Helv. chim. Acta, 18, 1435 of 1935.) This method gives the best yields of all of those described.

It will be noted that all of the methods described for the preparation of 3,4-dimethyl, 6-aminophenyl-d-ribamine require the use of d-ribose, or a derivative thereof. d-Ribose may be derived from natural sources, or prepared synthetically, but, under any circumstances, it is very difficult and expensive to obtain. The major cost in the synthesis of riboflavin may be attributed to the d-ribose required. In order to avoid the use of this expensive pentose, Weygand (Berichte, 73, 1264 of 1940) made novel use of a valuable organic reaction, the Amadori rearrangement. By this method, 3,4-dimethylaniline is condensed with d-arabinose. The resultant d-arabinoside, in the presence of a small amount of acid at an elevated temperature rearranges to form the 3,4-dimethylphenyl-d - isoarabinosamine, which is then reduced in alkaline solution to the 3,4-dimethylphenyl-d-ribamine. This compound can then be coupled with a diazonium salt and reduced, as described in paragraph (d) above. Although the overall yield of 3,4-dimethyl, 6-aminophenyl-d-ribamine is low (9–10%), the raw materials required for this synthesis are inexpensive. d-Arabinose can be prepared in good yield by submitting the low-cost and readily available calcium-d-gluconate to a Ruff degradation, i. e., oxidation with hydrogen peroxide in the presence of ferric acetate (Hockett and Hudson, Journ. Amer. Chem. Soc., 56, 1632 of 1934).

It is an object of the present invention to improve and simplify the procedure whereby the Amadori rearrangement may be used for the preparation of 3,4-dimethyl, 6-aminophenyl-d-ribamine, as well as to provide a novel synthesis of riboflavin that avoids the direct use of 3,4-dimethyl, 6-aminophenyl-d-ribamine, but employs rather a more easily obtained precursor thereof, the 3,4-dimethyl, 6-aminophenyl-d-isoarabinosamine.

According to Kuhn and Weygand (Berichte, 70, 769 of 1937), the Amadori rearrangement involves the conversion of arylamine-N-aldosides into the corresponding aryl-N-isoketosamines, in the presence of a small amount of acid at elevated temperatures. Thus, when the aldose is d-arabinose, the rearrangement probably goes through the following stages, catalyzed by the acid present:

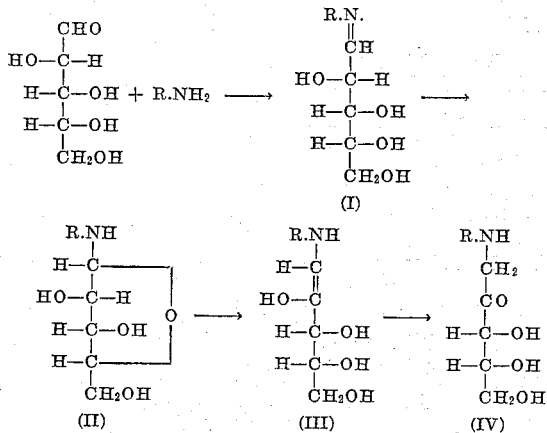

The Schiff base (I) first formed is in equilibrium with the furanose amino-aldoside (II). The oxygen-bridge of the latter readily breaks to form the -ol form (III) of the isoarabinosamine, which tautomerizes to the keto form (IV). When the original amine R.NH₂ is 3,4-dimethylaniline, the final isoketosamine is the 3,4-dimethylphenyl-d-isoarabinosamine. To effect this rearrangement, 1 mole of the aldose, 1.1 to 1.4 moles of the aryl amine and 0.002 to 0.02 mole of acid are heated in the presence of 2 to 4 moles of water at 70-90° C. for a few minutes. (Weygand; Berichte, 73, 1259-1276 of 1940.) The final product is a mixture of the arylamino-N-aldoside and the aryl-N-isoketosamine.

In the specification and claims of this invention, the term "isoaribityl" (see Compound M) (q. v. Weygand) refers either to the 2-keto-d-aribityl or to the 2-keto-d-ribityl group, or to both. The only difference between d-arabinose and d-ribose resides in the optical configuration of the asymmetric carbon in position 2. When this center of asymmetry is eliminated (e. g., by conversion to a keto group) both d-arabinose and d-ribose give the same 2-ketopentose. Thus, 2-keto-d-ribityl is the same group as 2-keto-d-aribityl, and is here referred to as d-isoaribityl.

The present invention is based on the following sequence of reactions:

(a) 3,4-dimethylaniline (Compound B) and d-arabinose (Compound C) are submitted to an Amadori rearrangement. The resultant mixture of 3,4-dimethylphenyl-d-isoarabinosamine (Compound D) and 3,4-dimethylaniline-d-arabinoside (Compound D') is then distilled with steam. The isoarabinosamine (Compound D) is not affected by this treatment, but the arbinoside (Compound D') readily hydrolyzes to give back the original 3,4-dimethylaniline and d-arabinose. The 3,4-dimethylaniline distills over with the steam and the major portion of the amine originally started with may thus be recovered for re-use.

The residue after the steam distillation comprises an oily layer of impure 3,4-dimethylphenyl-d-isoarabinosamine (Compound D) and an aqueous phase from which the major portion of the d-arabinose originally started with may be recovered for re-use. This impure 3,4-dimeth-ylphenyl-d-isoarabinosamine (Compound D) is now dissolved in a suitable organic solvent (e. g., 95% ethanol, glacial acetic acid), treated with a small amount of decolorized carbon and filtered.

(b) The solution of 3,4-dimethylphenyl-d-isoarabinosamine (Compound D) is now coupled with a diazotized arylamine (Compound E), of which the aryl nucleus is eventually removed, while a N-atom of the diazo linkage is retained. Although any arylamine may conveniently be used, I prefer to use an arylamine containing a water-solubilizing group on the ring, as in p-aminobenzoic acid, and sulfanilic acid, and many others which are available. The rationale for using an arylamine bearing a water-solubilizing group on the ring will become evident as this process is elaborated.

The reaction involved in this step is the following:

(Compound D)

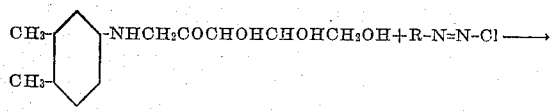

(Compound F)

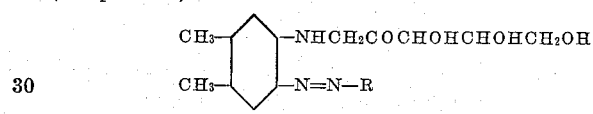

The mixture of the 3,4-dimethylphenyl-d-isoarabinosamine and the diazonium salt is agitated vigorously at 5-10° C. for 0.5 to 1.0 hour to effect the condensation illustrated above. The reaction mixture is then made alkaline and a deep reddish-brown solution and/or suspension of the 3,4-dimethyl, 6-arylazophenyl-d-isoarabinosamine (Compound F) is obtained.

(c) The 3,4-dimethyl, 6-arylazophenyl-d-isoarabinosamine (Compound F) is now reduced in alkaline solution. In general, two types of reducing agents may be employed; namely:

1. Reducing agents that will reduce both the azo-linkage (to the amine) and the keto group in the isoarabinosamine side-chain forming the corresponding secondary alcohol (Compound H). These agents (Compound G) include sodium amalgam in the presence of a stream of CO₂ (to neutralize the NaOH evolved), hydrogen in the presence of Raney nickel, and hydrogen in the presence of a reduced platinum catalyst. As Weygand has postulated, reduction of the d-isoarabinosamine side chain in alkaline solution leads only to the desired d-ribamin (Compound H) (Berichte, 73, 1262 of 1940), thus:

(Compound F)

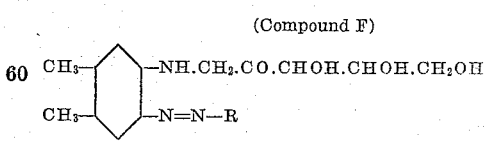

reduction ⟶

(Compound G)

(Compound H)

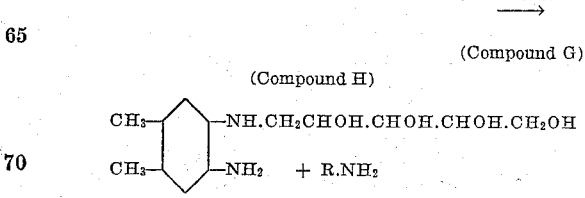

The reaction mixture, after reduction, is evaporated in vacuo to dryness. The residue is dissolved in a minimum amount of hot absolute ethanol, and filtered from insoluble material. If the original amine used for obtaining the diazotized arylamine contained a solubilizing group, i. e., if it was p-aminobenzoic acid, for example, it exists in the dried residue as the alkali-metal salt which is soluble in water but insoluble in the absolute alcohol. Thus, a convenient method is provided for the separation of the 3,4-dimethyl, 6-aminophenyl-d-ribamine (Compound H) and the original coupling amine that was regenerated by the reduction.

The 3,4-dimethyl, 6-aminophenyl-d-ribamine (Compound H) thus obtained may now be converted to riboflavin by condensation with alloxan, as described by Karrar and Kuhn (q. v. supra) (Compound L).

2. Reducing agents (Compound J) that will reduce only the diazo linkage. These agents include sodium hydrosulfite ($Na_2S_2O_4$) in alkaline solution, and nascent hydrogen in acid solution as produced by zinc dust in acid solution. The 3,4 - dimethyl, 6 - arylazophenyl - d - isoarabinosamine (Compound F) will thus be reduced to a new compound, 3,4-dimethyl, 6-aminophenyl-d-isoarabinosamine (Compound K):

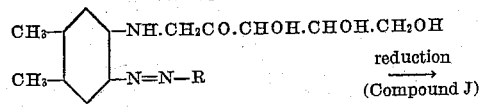

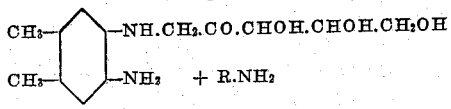

Where the used and regenerated amine is water-soluble, the new compound may likewise be separated from the concomitant regenerated coupling amine by evaporating the reaction mixture to dryness and extracting with hot absolute alcohol.

(d) The 3,4-dimethyl, 6-aminophenyl-d-isoarabinosamine (Compound K), obtained as described in the paragraph immediately above, is now condensed (Compound L) in glacial acetic acid with alloxan in the presence of boric acid as a catalyst, to yield a new compound 6,7-dimethyl, 9-(d-1'-isoaribityl isoalloxazine (Compound M):

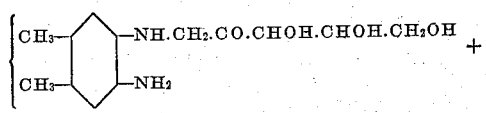

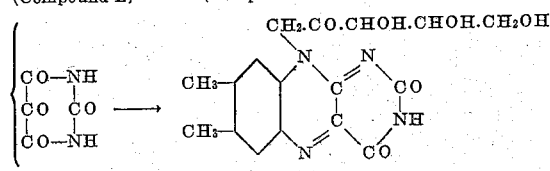

The acetic acid (Compound M) is distilled off in vacuo, the yellow residue of impure, 6,7-dimethyl, 9-(d-1'-isoaribityl) isoalloxazine is dissolved in a 0.2N sodium hydroxide solution in ethanol and the solution is hydrogenerated in the presence of a reduced platinum catalyst (the agent being herein designated Compound N for convenience). The 6,7-dimethyl, 9-(d-1'-isoaribityl) isoalloxazine (Compound M) is reduced to the leuco form of 6,7-dimethyl, 9-(d-1'-ribityl) isoalloxazine (Compound P):

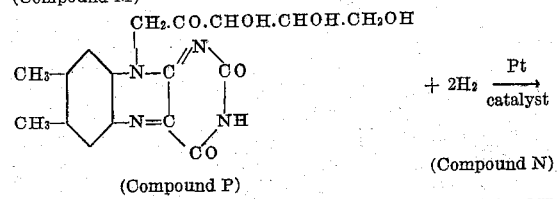

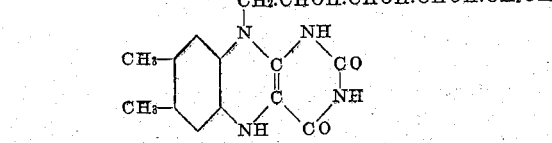

which rapidly reverts to riboflavin (Compound A) on shaking with air (Compound Q). The catalyst is filtered off and the riboflavin is recovered from the alcoholic filtrate by evaporating to dryness in vacuo. It is obvious, of course, that in this condensation, the use of boric acid as a catalyst is optional, and the use of alloxan, as mentioned in this specification and claims likewise refers to its functional equivalents, such as dialuric acid, isodialuric acid and alloxantine.

The following examples are given in order to define and illustrate this invention but in no way to limit it to reagents, proportions or conditions described therein. Numerous modifications will occur to any person skilled in the art.

EXAMPLE I

Step 1.—*Preparation of 3,4-dimethyl, 6-(p-carboxyphenylazo) phenyl - d - isoarabinosamine (Compound F) and (a species of 3,4-dimethyl, 6-arylazophenyl-d-isoarabinosamine)*

A mixture of 20.0 grams of d-arabinose, 16.0 grams of 3,4-dimethylaniline (Compound B), 1.0 gram of benzoic acid and 6.0 cc. of water is heated on the boiling water bath for six minutes. A homogeneous melt is soon obtained which is a mixture of 3,4-dimethylphenyl-d-isoarabinosamine (Compound D) and 3,4-dimethylaniline-d-arabinoside (Compound D'). 100 cc. of hot 95% alcohol is now added, and the solution is submitted to steam distillation until the distillate is substantially free of 3,4-dimethylaniline.

The residue in the distilling flask soon separates into two phases. The aqueous phase (containing the major portion of the d-arabinose originally used) is decanted and preserved. The dark brown oily residue is dissolved in 500 cc. of 95% ethanol, 2.0 grams of decolorizing carbon is added, the mixture is heated on the water-bath under reflux for 30 minutes and then filtered.

Simultaneously, a diazo solution is prepared by dissolving 2.75 grams of p-aminobenzoic acid and 4.0 cc. of concentrated hydrochloric acid in 50 cc. of ice water, chilling the solution to 5°–10° C., then adding dropwise with constant stirring, 14.0 cc. of 10% sodium nitrite solution.

The filtered alcoholic solution of 3,4-dimethylphenyl-d-isoarabinosamine (Compound D) is cooled, with constant stirring, to 10°–15° C., and the freshly prepared diazo solution (Compound E) is added slowly. Stirring is continued for an hour, and the solution is then made alkaline by the cautious addition of concentrated alcoholic NaOH solution. There is thus obtained a dark reddish-brown solution-suspension of the sodium salt of 3,4-dimethyl, 6-(p-carboxyphenylazo) phenyl-d-isoarabinosamine (Compound F).

The free acid may be obtained by diluting the alcoholic solution with three volumes of water and acidifying with acetic acid. A gummy reddish brown material separates out which rapidly solidifies and may be comminuted to amorphous brown particles, m. pt. 83°-84° (decomp.). For 3,4-dimethyl, 6-(p-carboxyphenylazo) phenyl-d-isoarabinosamine (Compound F): N (calculated) =10.5%; N (found) =10.7%. The yield is 5.1 grams.

*Step 2.—Preparation of 3,4-dimethyl, 6-aminophenyl-d-ribamine (Compound H)*

The alcoholic solution-suspension of the sodium salt of 3,4-dimethyl, 6-(p-carboxyphenylazo) phenyl-d-isoarabinosamine (Compound F), (prepared in step 1) is made 0.2N with respect to free sodium hydroxide, and a catalyst prepared from 3.0 grams of chlorplatinic acid according to the method of Adams in Jour. Amer. Chem. Soc. 44, 1937 (1922); 45, 2171 (1923) suspended in alcohol, is added. Hydrogen gas (Compound G) is now passed through the vigorously agitated solution at 25°-30° C. until the reduction is complete and no more hydrogen is absorbed. The catalyst, as well as other insoluble material, is now filtered off and the alcoholic filtrate is evaporated to dryness in vacuo. The dry residue is taken up in 100 cc. of hot absolute ethanol, filtered from insoluble material and evaporated to dryness. There are thus obtained 4.0 grams of light orange colored crystals, m. pt. 123°-124° C. For 3,4-dimethyl, 6-aminophenyl-d-ribamine (Compound H): N (calculated) =10.4%; N (found) =10.4%.

This 3,4-dimethyl, 6-aminophenyl-d-ribamine (Compound H) may now be converted to riboflavin by the methods of Karrer or Kuhn.

EXAMPLE II

*Step 1.—Preparation of 3,4-dimethyl, 6-(p-carboxyphenylazo) phenyl-d-isoarabinosamine*

This step is effected as described in Example I. By acidifying the steam-distillate with hydrochloric acid and distilling off the solvent, 10 grams of 3,4-dimethylaniline (Compound B) may be recovered (as the hydrochloride), and returned to the process. Similarly, from the aqueous phase of the distillation residue 12 grams of d-arabinose (Compound C) may be precipitated as the 2,4-dinitrophenylhydrazone. By adding this aqueous phase to the crude solution of d-arabinose obtained by following the procedure of Hockett and Hudson, immediately prior to the first decolorization with carbon (Jour. Amer. Chem. Soc. 56, pg. 1633, column 1, line 7, of July, 1934), there may be recovered 10 grams of d-arabinose in addition to the normal yield of 55 to 65 grams. Thus, the final yield of 5.1 grams of 3,4-dimethyl, 6-(carboxyphenylazo) phenyl-d-isoarabinosamine (Compound F) is obtained from an overall consumption of 6.0 grams of 3,4-dimethylaniline and 10.0 grams of d-arabinose.

*Step 2.—Preparation of 3,4-dimethyl, 6-aminophenyl-d-isoarabinosamine (Compound K)*

The alcoholic solution-suspension of the sodium salt of 3,4-dimethyl, 6-(carboxyphenylazo) phenyl-d-isoarabinosamine (Compound F) (prepared in step 1) is heated under reflux on the boiling water-bath and a saturated aqueous solution of sodium hydrosulfite (Compound J) is added slowly until the dark reddish-brown solution has been discharged to a dark orange color, and there is an excess of free reducing agent in solution. The reaction mixture is filtered while hot and the filtrate is evaporated to dryness in vacuo. The dry residue is taken up in 100 cc. of hot absolute ethanol, filtered from insoluble material and evaporated to dryness. There is thus obtained 4.1 grams of orange-colored crystals, m. pt. 119°-121° C. For 3,4-dimethyl, 6-aminophenyl-d-isoarabinosamine (Compound K): N (calculated) =10.4%, N (found) =10.3%.

*Step 3.—Preparation of riboflavin*

1.05 grams of 3,4-dimethyl, 6-aminophenyl-d-isoarabinosamine (Compound K) is dissolved in 60 cc. of glacial acetic acid and added to a solution of 0.95 gram of alloxan tetrahydrate (Compound L) and 1.80 grams of boric acid in 60 cc. of boiling glacial acetic acid. The mixture is gently refluxed in the dark for 15 minutes and the acetic acid is then distilled off in vacuo.

The crude residue of 6,7-dimethyl, 9-(d-1'-isoaribityl) isoalloxazine (Compound M) thus obtained is dissolved in 200 cc. of 0.2N NaOH in 95% ethanol and filtered from insoluble material. The Adams catalyst prepared from 1.5 grams of chlorplatinic acid, suspended in alcohol, is added and hydrogen gas is passed through the vigorously agitated solution at 25°-30° C. until the reduction is complete and no more hydrogen is absorbed. The catalyst is filtered off and the filtrate, comprising an alcoholic solution of leuco-6,7-dimethyl-9-(d-1'-ribityl) isoalloxazine (Compound P) is neutralized with acetic acid. It is then aerated for an hour to oxidize the leuco base (Compound P) by the oxygen (Compound Q) of the air and evaporated to dryness in vacuo. From the crude residue, riboflavin (Compound A) may be recovered on crystallization.

It is to be observed that in Example 2 the reducing agent (Compound J) is employed which reduces only the —N=N— group but not the —CO— group of Compound F, thus producing Compound K, which couples with the alloxan or equivalent Compound L to form Compound M; while in Example 1, a reducing agent (Compound G) is used which reduces both of said groups —N=N— and —CO— forming Compound H, which then coupled with a Compound L provides Compound M' which is similar to Compound M in all respects except that the —CO— group of Compound M is a —CHOH— group in Compound M'. The reducing agent Compound N reacts with either Compound M or Compound M' to give the leuco product (Compound P), which is oxidizable by air to riboflavin (Compound A).

Having described my invention, what I claim and desire to protect by Letters Patent is:

1. In the process of making riboflavin the steps of reacting d-arabinose with 3,4-dimethylaniline and thereby forming the compound 3,4-dimethylphenyl-d-isoarabinosamine, reacting the latter compound with a salt of a diazotized arylamine and thereby forming the compound 3,4-dimethyl, 6-arylazophenyl-d-isoarabinosamine, and reducing the latter compound by the action of a reducing agent selected from the group consisting of alkali metal hydrosulfites in neutral solution and in alkaline solution and nascent hydrogen in acid solution thereby forming 3,4-dimethyl, 6-aminophenyl-d-isoarabinosamine of the formula:

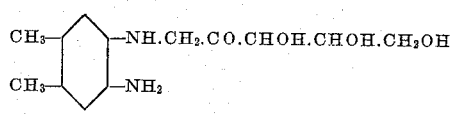

2. In the process of making riboflavin the steps of reacting d-arabinose with 3,4-dimethylaniline and thereby forming the compound 3,4-dimethylphenyl-d-isoarabinosamine, reacting the latter compound with a salt of a diazotized arylamine and thereby forming the compound 3,4-dimethyl, 6-arylazophenyl-d-isoarabinosamine, reducing the latter compound by the action of a reducing agent selected from the group consisting of alkali metal hydrosulfites in neutral solution and in alkaline solution and nascent hydrogen in acid solution thereby forming the compound 3,4-dimethyl, 6-aminophenyl-d-isoarabinosamine, and condensing the latter compound with alloxan thereby forming 6,7-dimethyl, 9-(d-1'-isoaribityl) isoalloxazine of the formula:

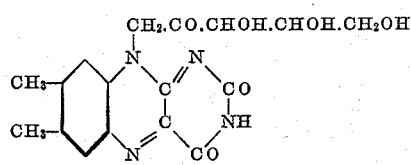

3. A process for the synthesis of riboflavin which comprises submitting 3,4-dimethylaniline and d-arabinose to an Amadori rearrangement, coupling the resultant 3,4-dimethylphenyl-d-isoarabinosamine with a diazonium salt of a diazotized aromatic amine to form the corresponding 3,4-dimethyl, 6-arylazophenyl-d-isoarabinosamine, reducing the latter by the action of a reducing agent selected from the group consisting of alkali metal hydrosulfites in neutral solution and an alkaline solution and nascent hydrogen in acid solution to form 3,4-dimethyl, 6-aminophenyl-d-isoarabinosamine, condensing the latter with alloxan in acid solution to form 6,7-dimethyl, 9-(d-1'-isoaribityl) isoalloxazine, reducing the latter in alkaline solution to the leuco form of riboflavin by the action of hydrogen acting in the presence of a hydrogenation catalyst, and oxidizing said leuco form to riboflavin.

4. In a process for the synthesis of riboflavin, the step which comprises reducing 3,4-dimethyl, 6-arylazophenyl-d-isoarabinosamine to 3,4-dimethyl, 6-aminophenyl-d-ribamine by the action of a reducing agent selected from the group consisting of (1) sodium amalgam, and (2) hydrogen acting in the presence of a hydrogenation catalyst.

5. In a process for the synthesis of riboflavin, the step which comprises reducing 3,4-dimethyl, 6-(p-carboxyphenylazo) phenyl-d-isoarabinosamine to 3,4-dimethyl, 6-aminophenyl-d-ribamine by the action of a reducing agent selected from the group consisting of (1) sodium amalgam, and (2) hydrogen acting in the presence of a hydrogenation catalyst.

6. In a process for the synthesis of riboflavin, the step which comprises reducing 3,4-dimethyl, 6-arylazophenyl-d-isoarabinosamine to 3,4-dimethyl, 6-aminophenyl-d-isoarabinosamine by the action of a reducing agent selected from the group consisting of alkali metal hydrosulfites in neutral solution and in alkaline solution and nascent hydrogen in acid solution.

7. In a process for the synthesis of riboflavin, the step which comprises reducing 3,4-dimethyl, 6-(p-carboxyphenylazo) phenyl-d-isoarabinosamine to 3,4-dimethyl, 6-aminophenyl-d-isoarabinosamine by the action of a reducing agent selected from the group consisting of alkali metal hydrosulfites in neutral solution and in alkaline solution and nascent hydrogen in acid solution.

8. In a process for the synthesis of riboflavin, the step which comprises condensing 3,4-dimethyl, 6-aminophenyl-d-isoarabinosamine with alloxan in acid solution.

9. In a process for the synthesis of riboflavin, the step which comprises condensing 3,4-dimethyl, 6-aminophenyl-d-isoarabinosamine with alloxan in acetic acid solution.

10. In a process for the synthesis of riboflavin, the step which comprises reducing 6,7-dimethyl-9-(d-1'-isoaribityl) isoalloxazine by the action of hydrogen acting in the presence of a hydrogenation catalyst, and dehydrogenating the resulting leuco-6,7-dimethyl, 9-(d-1'-ribityl) isoalloxazine thereby forming riboflavin.

11. The process of producing riboflavin which comprises reacting 3,4-dimethylaniline and d-arabinose by an Amadori rearrangement while forming thereby 3,4-dimethyl-phenyl-d-isoarabinosamine, coupling the latter with a diazonium salt of a diazotized aromatic amine thereby forming 3,4-dimethyl, 6-arylazophenyl-d-isoarabinosamine, reducing the latter by the action of a reducing agent selected from the group consisting of (1) sodium amalgam, and (2) hydrogen acting in the presence of a hydrogenation catalyst thereby forming 3,4-dimethyl, 6-aminophenyl-d-ribamine, and condensing the latter with an agent selected from the group consisting of alloxan, dialuric acid, isodialuric acid and alloxantine.

12. The process of producing riboflavin which comprises reacting 3,4-dimethylaniline and d-arabinose by an Amadori rearrangement while forming thereby 3,4-dimethylphenyl-d-isoarabinosamine, coupling the latter with a diazonium salt of a diazotized aromatic amine thereby forming 3,4-dimethyl, 6-arylazophenyl-d-isoarabinosamine, the latter containing a benzene nucleus having attached thereto the linkage —N=N—, reducing the —N=N— group by the action of a reducing agent selected from the group consisting of (1) sodium amalgam, (2) hydrogen in the presence of a hydrogenation catalyst, (3) alkali metal hydrosulfites in neutral solution and in alkaline solution, and (4) nascent hydrogen in acid solution, thereby forming a compound having the resulting group

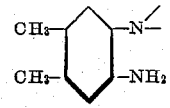

condensing the said resulting compound with a compound selected from the group consisting of alloxan, dialuric acid, isodialuric acid and alloxantine, while thereby forming the essential grouping

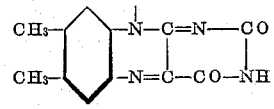

and reducing the resulting compound by the action of hydrogen and a hydrogenation catalyst thereby forming the leuco base of riboflavin from which riboflavin is obtained by oxidation.

13. The process of producing riboflavin which comprises reacting 3,4-dimethylaniline and d-arabinose by an Amadori rearrangement while forming thereby 3,4-dimethylphenyl-d-isoarabinosamine, coupling the latter with a diazonium salt of a diazotized aromatic amine thereby forming 3,4-dimethyl, 6-arylazophenyl-d-isoarabinosamine, the latter containing a benzene nucleus having attached thereto the linkage —N=N—, subjecting the resulting 3,4-dimethyl, 6-arylazo-phenyl-d-isoarabinosamine to reduction by the action of a reducing agent selected from the group consisting of (1) sodium amalgam, (2) hydrogen in the presence of a hydrogenation catalyst, (3) alkali metal hydrosulfites in neutral solution and in alkaline solution, and (4) nascent hydrogen in acid solution thereby at least reducing the —N=N— group to one —NH₂ group in an aryl amino compound, subjecting the said aryl-amino compound to condensation with a compound selected from the group consisting of alloxan, dialuric acid, isodialuric acid and alloxantine thereby forming the essential grouping

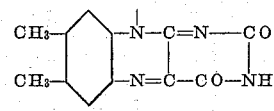

reducing the said essential grouping by the action of hydrogen in the presence of a hydrogenation catalyst to the leuco base of riboflavin from which riboflavin is obtained by oxidation.

JONAS KAMLET.